United States Patent [19]

Sakata et al.

[11] Patent Number: 4,823,197
[45] Date of Patent: Apr. 18, 1989

[54] RECORDING APPARATUS AND REPRODUCING APPARATUS

[75] Inventors: Tsuguhide Sakata; Norio Kimura, both of Tokyo; Masahiro Takei, Kanagawa, all of Japan

[73] Assignee: Canon Kabushiki Kaisha, Tokyo, Japan

[21] Appl. No.: 945,348

[22] Filed: Dec. 22, 1986

[30] Foreign Application Priority Data

Feb. 27, 1985 [JP] Japan ................................ 60-297223

[51] Int. Cl.$^4$ ............................................. H04N 9/79
[52] U.S. Cl. .................................... 358/310; 358/330; 358/343
[58] Field of Search ............... 358/310, 328, 330, 343; 360/19.1, 33.1

[56] References Cited

U.S. PATENT DOCUMENTS 4,580,174  4/1986  Tokunaka ........................... 358/328

Primary Examiner—L. T. Hix
Assistant Examiner—D. Rutledge
Attorney, Agent, or Firm—Robin, Blecker & Daley

[57] ABSTRACT

Disclosed are a recording apparatus for recording video signals or audio signals on a recording medium wherein a first sound is recorded in that band which is to be used for recording the luminance signal component of the video signal and a second sound is recorded in that band which is to be used for recording the chrominance signal component of the video signal, and a reproducing apparatus for reproducing the video signals or audio signals recorded on the recording medium wherein the signal recorded in that band which is to be used for recording the luminance signal component of the video signal is reproduced as the first sound, and the signal recorded in that band which is to be used for recording the chrominance signal component of the video signal is reproduced as the second sound.

40 Claims, 5 Drawing Sheets

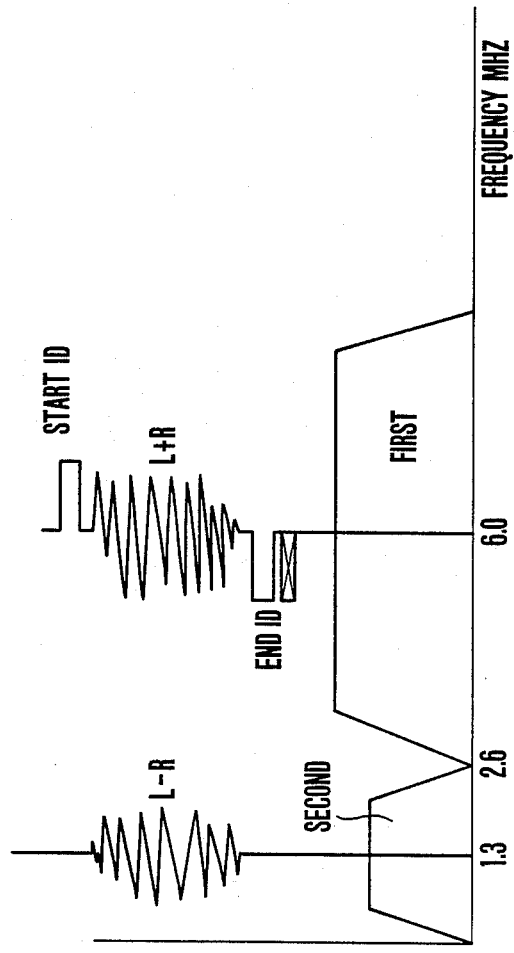

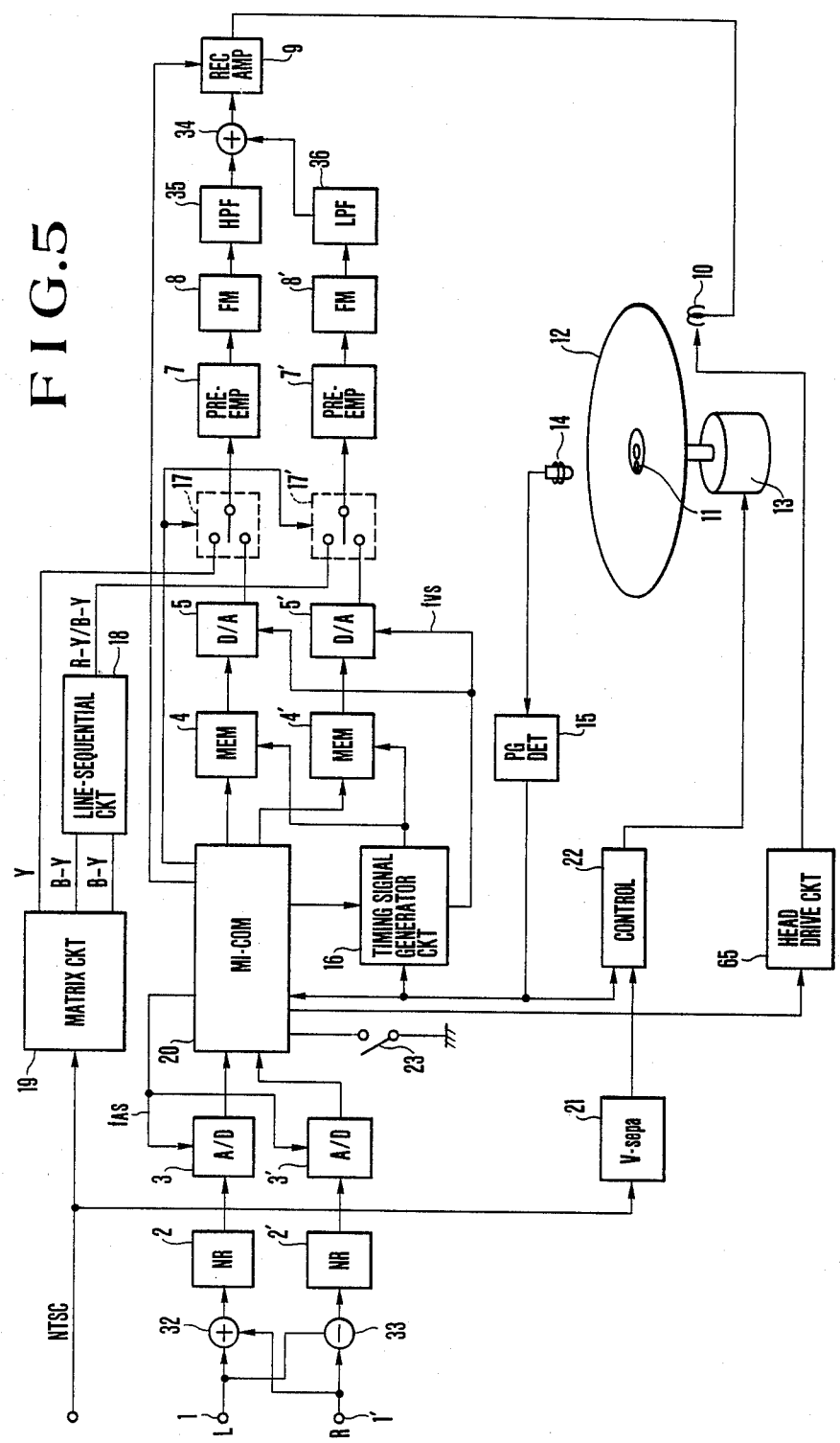

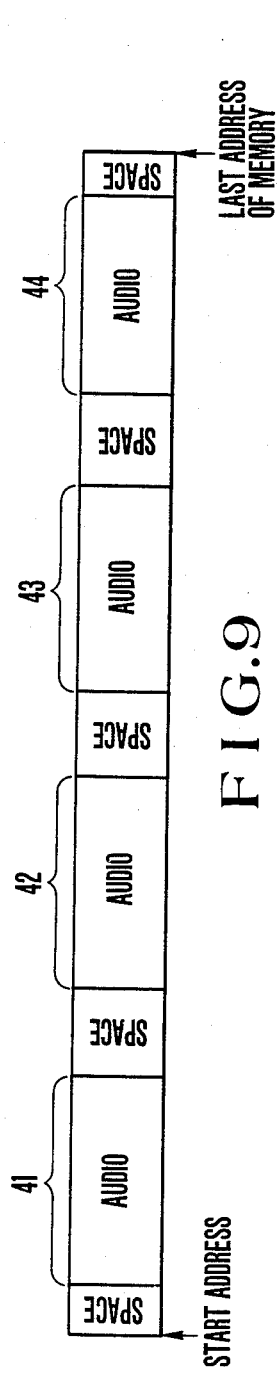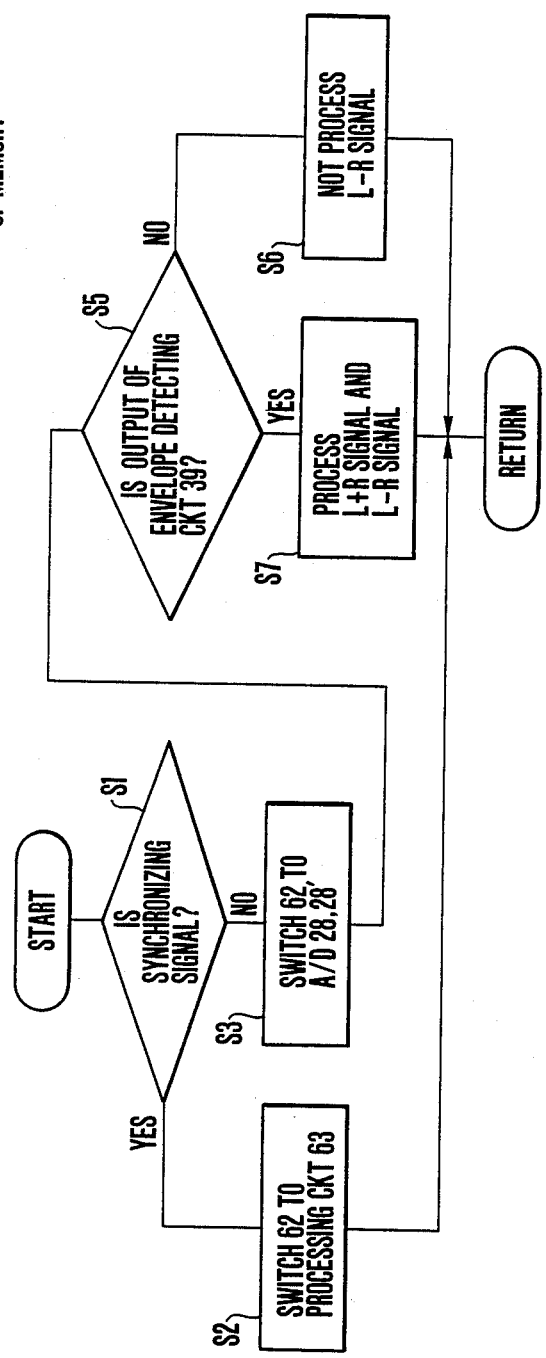

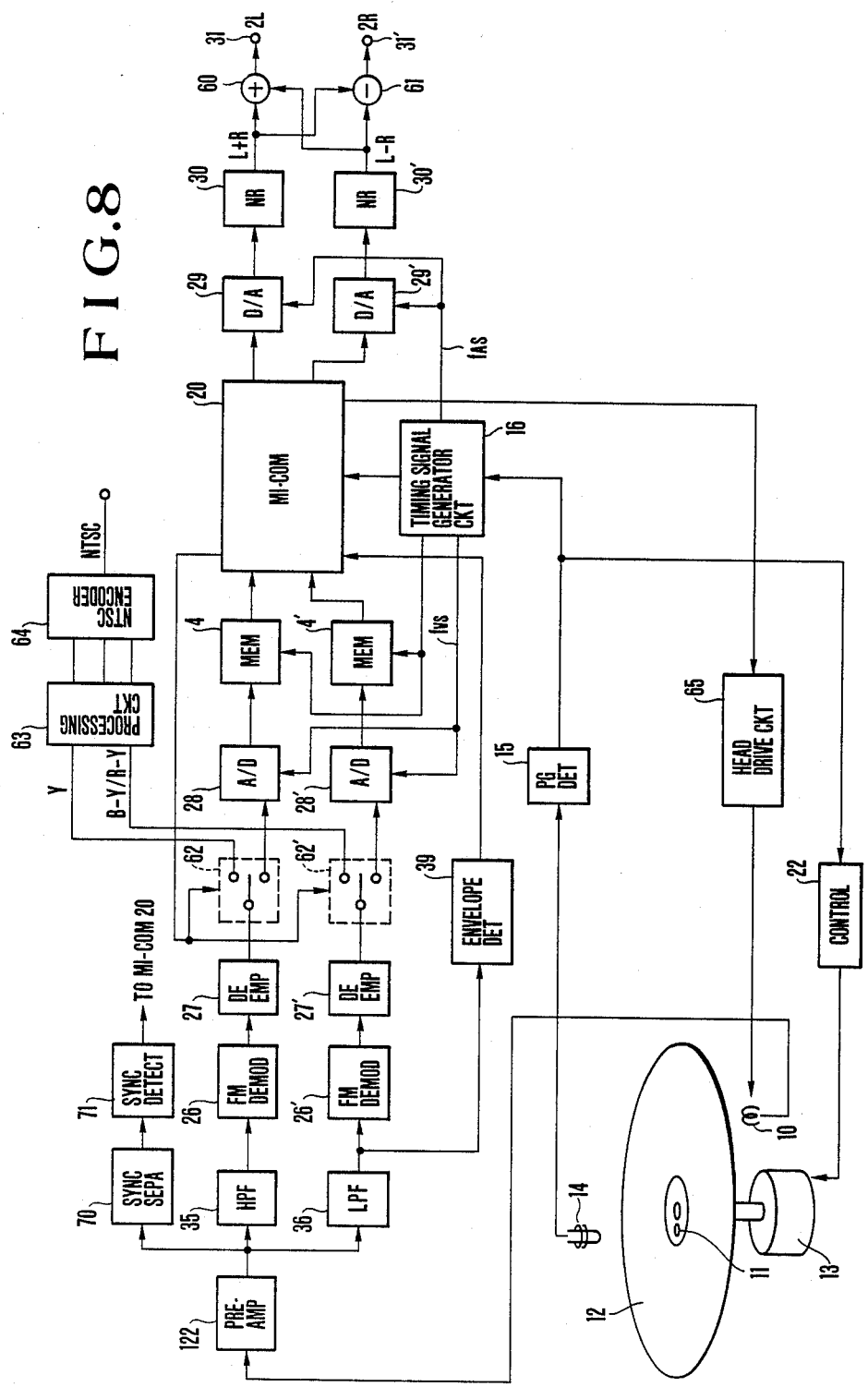

RECORDING APPARATUS AND REPRODUCING APPARATUS

BACKGROUND OF THE INVENTION

1. Field of the Invention

This invention relates to recording or reproducing apparatus, and more particularly to recording or reproducing apparatus capable of recording or reproducing either video signals or audio signals.

2. Description of Related Art

For example, the still video camera uses the magnetic sheet. In such a recording medium, besides video signals, audio signals also can be recorded.

Taking an example of the format of the still video camera, we will conduct the following discussion.

The magnetic sheet in the still video camera is able to form 50 concentric tracks thereon, and rotates 60 revolutions per second about the axis of rotation. To perform sound recording in such tracks, the time base of the audio signal is compressed with increase in the frequency, and further FM-modulated. The time for which sound can be recorded in one track is, for example, 10 or 20 sec. differing with difference of the compressibility factor of the time base.

However, in the above-described recording or reproducing apparatus, there was a problem in that the only recordable or reproducible sound is monophonic.

Therefore, if the sound recording or reproducing necessitates two channels as, for example, in stereo, it can no longer be carried out.

SUMMARY OF THE INVENTION

A first object of the invention is to eliminate such a problem and to provide a recording apparatus or a reproducing apparatus which enables a recording or reproduction such as stereo reproduction to be well performed.

A second object of the invention is to provide a recording apparatus or reproducing apparatus capable of effectively recording or reproducing a plurality of sound signals.

A third object of the invention is to provide a recording or reproducing apparatus of simple structure yet capable of recording or reproducing selectively either of video signals and audio signals.

Under the above-described objects, in a preferred embodiment of the invention, the recording apparatus for recording video signals or audio signals on a recording medium is provided with control means for making first sound to be recorded in a band to be used for recording the luminance component of the aforesaid video signal, and second sound to be recorded in a band to be used for recording the chrominance components of the aforesaid video signal, and the reproducing apparatus for reproducing the video signals or audio signals recorded on the aforesaid recording medium is provided with control means for reproducing as the first sound the signal recorded in that band which is to be used for recording the luminance signal of the aforesaid video signal, and as the second sound the signal recorded in that band which is to be used for recording the chrominance component of the aforesaid video signal.

Another object of the invention is to provide a recording apparatus and a reproducing apparatus capable of recording or reproducing stereo sound in or from a compatible format with the presently defined standard still floppy disc.

These and other objects and features of the invention will become apparent from the following description of embodiments thereof taken in conjunction with the accompanying drawings.

BRIEF DESCRIPTION OF THE DRAWINGS

FIGS. 4(a) to 4(c) are similar to FIG. 3 except that three combinations of the start and end ID signals of either pole shown in FIG. 3 are illustrated.

FIG. 5 is a block diagram illustrating the structure of construction of the first embodiment of the invention.

FIG. 6 is a graph illustrating the frequency spectrum of the FM-modulated signal recorded in the track.

FIG. 7 is a diagram illustrating the locations at which the data are stored in the memory 4,4' shown in FIG. 5.

FIG. 8 is a block diagram illustrating the structure of construction of the second embodiment of the invention.

FIG. 9 is a flow chart illustrating a manner in which the microcomputer operates.

DETAILED DESCRIPTION OF THE PREFERRED EMBODIMENTS

In the embodiments of the invention to be described below, there is shown a recording and reproduction apparatus having a function that a still picture is converted to video signals by using the image pickup element, and the video signals after having been separated into the luminance signal component and chrominance signal component are recorded with modulation on the magnetic sheet, another function that a color video signal is obtained from the reproduced luminance signal component and the chrominance signal component from the magnetic sheet, and yet another function of recording and reproducing sound.

Before describing the features of the apparatus of the invention, we explain about the magnetic sheet and the form of the audio signal recordable in that magnetic sheet.

Figure 1:
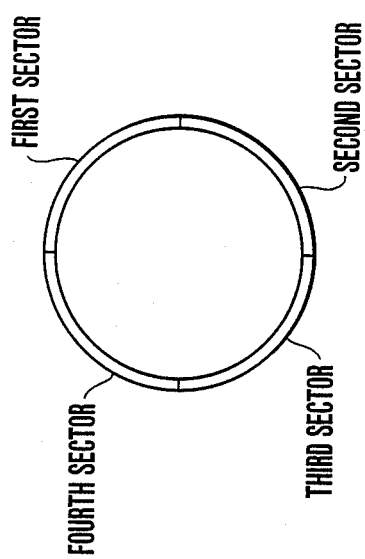
FIG. 1 is a plan view of a magnetic sheet 12 according to the present invention.

Referring to FIG. 1, the magnetic sheet 12 housed in a jacket (not shown) usable in the embodiment of the invention has concentric audio tracks $A_1$ and $A_2$ formed thereon, and a video track V formed similarly thereto in recording a video signal. The positions of the audio and video tracks are not necessarily predetermined as shown in the drawing. So any desired track may be chosen to record either one of the audio and video signals. It should be pointed out here that the audio signal is recorded in such a form that the time base is compressed to shift the frequency band up to the level of video band, and the frequency is modulated. The time for which sound can be recorded in each track is about 10 sec. for an audio band of 5 KHz and a time compression factor of 640, or about 20 sec. for an audio band of 2.5 KHz and a time compression factor of 1,280.

Figure 2:
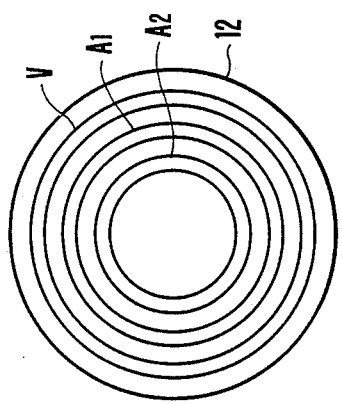
FIG. 2 is a plan view illustrating that the tracks on the magnetic sheet 12 shown in FIG. 1 are divided into four sectors.
Figure 3:
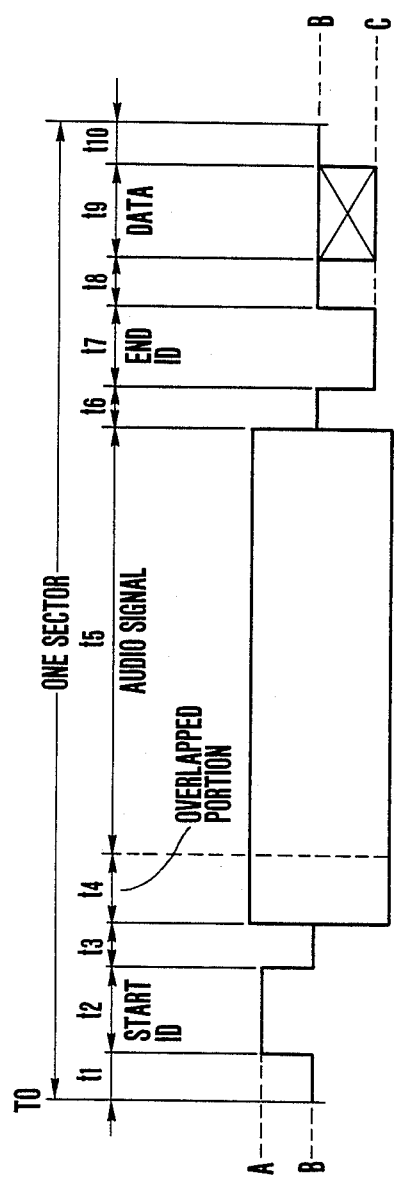
FIG. 3 is a diagram illustrating the signals obtained in sequence when they are read out from the first sector.

The audio track is divided into four sectors as shown in FIG. 2. In each of the sectors there are recorded signals which when in reproduction are obtained from the head time-sequentially as the magnetic sheet 12 rotates as shown in FIG. 3. After $t_1$ sec. from a time point $T_0$ indicated at the left hand end of a line B-B in FIG. 3, a start ID signal rises to and is maintained at a high level A for $t_2$ sec. to obtain a timing for reading out audio information. Then, after a blank period of $t_3$ sec. an audio signal for $t_4$ sec. and $t_5$ sec. follows.

It is to be noted here that the first $t_4$ sec. represents an over-lapped portion between the given and preceding sectors. Therefore, the audio signal in the first sector has no such overlapped portion. Hence, it exists in the second sector and those that follow.

After a second blank period of $t_6$ sec an end ID signal of $t_7$ sec appears to allow for detection of the termination of duration of the audio signal. Then, after a third blank period of $t_8$ sec. data to be described later are produced for a period of $t_9$ sec. By adding a further blank period of $t_{10}$ sec the structure of one sector is completed.

It is to be also noted that the signal shown in FIG. 3 is in FM-modulated form with its frequency in the ordinate. The line B-B represents a level equal to the center of a range of frequencies in which it is to be FM-modulated with the maximum value at A and the minimum value at C.

Next we explain the significance of the start and end ID signals by using FIGS. 4(a) to 4(c).

In FIG. 4(a), the start ID signal has high level and the end ID signal has low level. This combination of the levels of the start and end ID signals implies that the thus-indexed audio signal is continued to the one in the next sector. The start and end ID signals of FIG. 4(b) both have high level, implying that the audio signal recorded in this sector is the last recorded one. In FIG. 4(c), the start ID signal changes to low level, while the end ID signal remains high level. The sector with this start ID signal is meant to be vacant or to have nothing recorded yet.

Also, various data necessary to control the reproducing operation such as the preset value of the above-described compression factor are stored in the area labelled "data".

Referring now to FIG. 5, an apparatus for recording and reproducing video signals and audio signals in the above-described way has a recording portion which constitutes an embodiment of the invention. A stereophonic audio signal has left-channel and rightchannel informations hereinafter referred to as the "L" and "R" signals respectively which enter at input terminals 1 and 1' respectively. An adder 32 produces an output representative of L+R, and a subtractor 33 produces an output representative of L−R. These outputs or L+R signal and L-R signal are applied through noise reduction circuits 2 and 2' to A/D converters 3 and 3' for the audio signal band respectively. A microcomputer 20, memories 4 and 4' for use in compressing the time base of the audio signal, D/A converters 5 and 5' for the video signal band, pre-emphasis circuits 7 and 7', FM modulators 8 and 8', an adder 34 for producing an output representative of the sum of the FM-modulated L+R and L−R signals, a high pass filter 35 for passing the luminance signal band or high frequency component therethrough, a low pass filter 36 for passing the chrominance signal band or low frequency component therethrough, and a recording amplifier 9 are also included.

Here, the central frequencies of carrier waves for the FM modulators 8 and 8' and their maximum frequency shifts are shown in FIG. 6.

The abscissa of the coordinates of FIG. 6 represents the frequency in MHz and the ordinate represents the time. As the frequency of the FM-modulated audio signal varies with time, the central value of frequency of the FM modulator 8 is 6 MHz, and that of frequency of the FM modulator 8' is 1.3 MHz. Therefore, the cutoff frequency of the aforesaid high pass and low pass filters 35 and 36 is chosen to be 2.6 MHz.

A 1-channel head or one of two frame-2-channel heads or in-line type 2-channel heads is indicated at 10. A PG pin 11 made of magnetic material is positioned on the core of the magnetic sheet 12. The magnetic sheet 12 is driven to rotate by an electric motor 13. When the PG pin 11 moves across a sensor or coil 14, a PG detecting circuit 15 produces an output or PG signal. Responsive to the PG signal, a timing signal generator circuit 16 drives the memories 4 and 4' and D/A converters 5 and 5' in timed relationship. The operation of selector circuits 17 and 17' is controlled by a signal from the microcomputer 20 in such a manner that one of the analog signal from the D/A converter 5 and the luminance signal Y separated out from the NTSC signal by a matrix circuit 19 is applied to the pre-emphasis circuit 7, and one of the analog signal from the D/A converter 5' and the line-sequential color-difference signal (R−Y)/(B−Y) from a line-sequential circuit 18 is applied to the preemphasis circuit 7'. Another function of the microcomputer 20 is to compress the time base of the audio signal in such a way that the audio signals in the digital form from the A/D converters 3 and 3' are sampled and the thus-compressed signals are transferred to the memories 4 and 4' from which they are read out as the memories 4 and 4' and the D/A converters 5 and 5' are driven in response to the output of the PG detecting circuit 15. The audio and video record modes are selected to operate by a switch 23 accessible from the outside of the apparatus. A vertical sync separator 21 receptive of the NTSC signal produces a vertical synchronizing signal. A control circuit 22 compares the phases of the signal from the PG detecting circuit 15 and the vertical synchronizing signal with each other to control the enter, the only control signal for the motor 13 is obtained from the PG detecting circuit 15 so that it rotates at a constant speed. A head drive circuit 65 moves the head 10 on the basis of a signal from the microcomputer 20.

The operation of the recording apparatus of such construction is as follows: Assuming that the video record mode is first to be operated, then the the microcomputer 20 moves the selector circuits 17 and 17' so that the outputs of the line-sequential circuit 18 and the matrix circuit 19 are connected to the inputs of the pre-emphasis circuits 7 and 7' respectively.

In this case, therefore, the luminance signal Y is emphasized by the pre-emphasis circuit 7, then modulated by the FM modulator 8, and then filtered through the high pass filter 35. Meanwhile, the line sequential signal (R−Y)/(B−Y) also is emphasized by the pre-emphasis circuit 7', then modulated by the FM modulator 8', and then filtered through the low pass filter 36. The outputs of the high and low pass filters 35 and 36 are then summed up by the adder 34 to obtain a color video signal. As the magnetic sheet 12 rotates one revolution, the microcomputer 20 responsive to the output of the PG detecting circuit 15 produces a control signal for the recording amplifier 9. Hence, the video signal for one picture frame from the recording amplifier 9 is recorded in one track by the magnetic head 10.

To operate the audio record mode, the operator turns on the switch 23. The microcomputer 20 then moves the selector circuits 17 and 17' to the opposite positions where the D/A converters 5 and 5' are connected to the pre-emphasis circuits 7 and 7' respectively.

For, in this embodiment, as has been described above, the sound to be recorded is stereophonic, the L and R signals are received in the input terminals 1 and 1' independently of each other, but combined by the adder 32 and subtractor 33 to form the L+R and L−R signals.

These signals are sent through the noise reduction circuits 2 and 2' to the audio signal band responsive A/D converters 3 and 3' in which they are converted to digital signals with the help of a sampling signal $f_{AS}$ (A/D converting clock) from the microcomputer 20. Notice here that, as has been described above, the frequency of the sampling signal $f_{AS}$ from the microcomputer 20 varies as a function of the compression factor. Hence, the A/D conversion by the A/D converters 3 and 3' is recycled in synchronism with the sampling signal. The thus-sampled digital values of the outputs of the A/D converters 3 and 3' are put into the memories 4 and 4' and stored at respective locations as shown in FIG. 7. For note, the memories 4 and 4' are assigned to the L+R and L−R signals in digital form respectively.

FIG. 7 shows the addresses of the memories 4 and 4' in the horizontal line with the labels enclosed within the blocks representing the kinds of recorded data. As shown in FIG. 7, the corresponding digital data to the audio signals produced from the A/D converters 3 and 3' are sequentially written in the respective areas indicated at 41, 42, 43 and 44. During this writing-in operation, some of the addresses are left to write nothing therein. Yet, after the writing-in of the sound information has been completed, the data shown in FIG. 3 and the control or ID signals shown in FIGS. 3 and 4(a) to 4(c) start to be written in the remaining areas labelled "space".

After all the "space" areas have been filled with the code data and the control signals, when the thus-addressed data are read out in prescribed clock cycles from the start address to the stop address in sequence, they can be recorded on the magnetic sheet 12 in the above-defined standard format shown in FIG. 3. For this purpose, at the termination of duration of writing the format of addressing the audio record of data and the control signals in the memories 4 and 4', the microcomputer 20 produces an actuating signal for the timing signal generator 16. Then, the generator 16 responsive to the signal from the PG detecting circuit 15 produces a drive signal for the memories 4 and 4' and the D/A converters 5 and 5'. Hence, during the time when the magnetic sheet 12 rotates one revolution, the audio signals in the memories 4 and 4' are read out and transferred through the pre-emphasis circuits 7 and 7', FM modulators 8 and 8' and high and low pass filters 35 and 36 respectively to the adder 34 and therefrom to the recording amplifier 9, being recorded by the head 10.

Therefore, the recording of the L+R signal takes its place in that band which would otherwise be used to record the luminance signal component when in the video mode, and the record of the L−R signal in that band which would otherwise be used to record the chrominance signal component.

It will be appreciated that, in the embodiment of the invention, the signal of L+R is recorded after having been FM-modulated in the luminance signal band and the signal of L−R is recorded after having been FM-modulated in the chrominance signal band.

According to the embodiment of the invention, therefore, the pre-emphasis circuit 7, FM-modulator 8 and high pass filter 35 used for modulating the luminance component of the video signal are operable to modulate the L+R signal. Also the pre-emphasis circuit 7', FM modulator 8' and low pass filter 36 are operable both when the chrominance component of the video signal is modulated and when the L−R signal is modulated.

We next explain a reproducing apparatus of the invention by using FIG. 8.

In FIG. 8, the elements having the same functions as those shown in FIG. 5 are denoted by the same reference characters and their explanation is omitted here.

The apparatus of FIG. 8 includes a reproducing preamplifier 122 for amplifying the reproduced signal from the head 10, FM demodulators 26 and 26' for demodulating the outputs of the high and low pass filters 35 and 36, de-emphasis circuits 27 and 27' having the opposite conversion characteristics to those of the pre-emphasis circuits 7 and 7' of FIG. 5, video signal band-responsive A/D converters 28 and 28', audio signal band-responsive D/A converters 29 and 29', noise reduction circuits 30 and 30' having the opposite characteristics to those of the ones of FIG. 5, a detecting circuit 39 for detecting an evelope output representing whether or not the head 10 is accessed on the track, and an adder 60 and a subtractor 61 for recovering 2L and 2R signals respectively from the L+R and L−R signals. The outputs of the FM demodulators 27 and 27' are applied either to the respective A/D converters 28 and 28' or to a common processing circuit 63 when selector circuits 62 and 62' are operated by a signal from the microcomputer 20. When in the video reproduction mode, the processing circuit 63 performs clamping of the outputs of the FM demodulators 27 and 27', or the luminance signal Y and line-sequential color difference signal (R−Y)/(B−Y), conversion of the line-sequential signal to a line-simultaneous signal, and other operations. An NTSC encoder 64 receptive of the output of the processing circuit 63 produces an NTSC signal. A sync separator 70 receptive of the output of the preamplifier 122 produces synchronizing signals. The level of the synchronizing signal separated by the sync separator 70 is detected by a detecting circuit 71. As is well known, the synchronizing signals are included in the video signal. In the audio signal shown in this embodiment, on the other hand, there are no synchronizing signals, although it contains the ID signals. This allows the microcomputer 20 to be able to discriminate which signal, the video or the audio, is being reproduced when it receives the output of the detecting circuit 71.

The operation of the apparatus of the character described in connection with FIG. 8 is next described by reference to the flow chart of FIG. 9 for the microcomputer. As the speed of rotation of the magnetic sheet 12 varies, the coil 14 as the sensor responsive to motion of the PG pin 11 produces an output signal which is then applied to the PG detecting circuit 15. Counting the pulses from the PG detecting circuit 15, a control circuit 22 adjusts the speed of rotation of the motor 13 to a prescribed value.

As the head 10 is controlled by the microcomputer 20 based on the output of the envelope detecting circuit 39, it has already been positioned in alignment with one of the tracks in the magnetic sheet 12.

Now assuming that the track the head 10 has accessed has the record of video signal.

In such a case, what is to be reproduced is the video signal. Since the microcomputer 20 has determined from the output of the synchronizing signal detecting circuit 71 that the synchronizing signals are present, the flow branches from a step $S_1$ to a step $S_2$ in which the selector circuits 62 and 62' are moved to connect the outputs of the FM demodulators 27 and 27' to the inputs of the processing circuit 63 as has been described above. Therefore, the corresponding outputs of the high and low pass filters 35 and 36 to the separated components of the video signal, namely, the luminance signal Y and the line-sequential color difference signal $(R-Y)/(B-Y)$, are demodulated by the FM demodulators 26 and 26', then de-emphasized by the de-emphasis circuits 27 and 27' respectively, then processed by the processing circuit 63, and then converted to a video signal by the NTSC encoder 64.

It will now be assumed that the track the head 10 has accessed has the record of the audio signal.

For such a case, because no synchronizing signals are detected, the flow advances from the step $S_1$ to a step $S_3$ in which the selector circuits 62 and 62' are moved to connect the outputs of the FM demodulators 27 and 27' to the inputs of the A/D converters 28 and 28'.

Also, the timing signal generator 16 is reset by the signal from the PG detecting circuit 15, and the memories 4 and 4' are driven in synchronism with revolution of the magnetic sheet 12. At the same time, the head 10 picks up the audio signal recorded on that track in the magnetic sheet 12 which is in alignment with the head 10. This audio signal is amplified by the pre-amplifier 122, then separated into the two bands for the L+R and L−R signals by the HPF 35 and LPF 36 respectively, and then sent to the respective FM demodulators 26 and 26'. The signals demodulated here are subjected to the treatment of the opposite characteristics to those of the emphasis treatment of the recording mode in the de-emphasis circuits 27 and 27'.

As the position of the head 10 is changed by the head drive circuit 65, only when the output of the envelope detecting circuit 39 reaches the maximum, or only when the head 10 just traces the track in the magnetic sheet, the A/D converters 28 and 28' perform A/D conversion, and the memories 4 and 4' store the audio signals which have been returned to the digital values by the A/D conversion. Therefore, the information that occurs when the head 10 while being maintained in exact alignment with the track in the magnetic sheet 12 traces that track is memorized. In such a case, the rotation of the motor 13 is controlled by the control circuit 22 based on the signal from the PG detecting circuit 15. When the reading-out of one track terminates, the microcomputer 20 reads out the directions of the start and end ID signals from the memory 4. Upon detection of the trailing edge of the end ID signal, the microcomputer 20 starts to read the value of the compression factor of the time base, and, if the sound is continuously followed by a sound in another track, the number of this track from the code data. Based on such informations, the microcomputer 20 determines the value of an expansion factor of the time base for the reproduction of the sound the order of reproduction of the sound tracks, or the one of the video signal-recorded tracks which is to be reproduced for display during the reproduction of the sound.

Also, when the envelope detection circuit 39 produces an output signal representing that the recorded sound is stereophonic, the microcomputer 20 responsive to it in a step $S_5$ performs a stereophonic sound reproducing operation. That is, when in the stereophonic reproduction, the microcomputer 20 reads out the L+R and L−R signals stored in the memories 4 and 4' in sequence, and sends them to the D/A converters 29 and 29' (step $S_7$) For note, the reading-out operation for this case may otherwise be activated by an offering signal from the timing generator 16. Also, when the memories 4 and 4' are read out, the "space"-labelled areas must be skipped over as a matter of course.

Also, when the envelope detecting circuit 39 does not produce that output signal, the track being reproduced is determined to have had the monophonic sound recorded.

In such a case, when in the reproduction mode, the output of the low pass filter 36 should not being added to the output of the high pass filter 35, so that the L+R signal only is reproduced (step $S_6$)

For this purpose, the output of the low pass filter 36 may be muted, and instead that circuit which handles the L−R signal is substantially rendered in operative so that the information stored in the memory 4' is not read out.

As has been described above, according to this embodiment of the invention, the video signal processing circuit and the audio signal pr circuit are realized with common parts. Specifically speaking, the common parts of the recording system are the pre-emphasis circuits 7, 7', the FM modulators 8, 8', the HPF 35, the LPF 36, the adder 34 and the recording amplifier 9 shown in FIG. 5. In the reproducing system, they are the pre-amplifier 122, the HPF 35, the LPF 36, the FM demodulators 26, 26' and the de-emphasis circuits 27, 27' shown in FIG. 8. This produces an advantage in that construction of the circuit is simplified.

As has been described above, in the embodiments of the invention, the apparatus for recording video signals and/or sound signals on a recording medium is provided with control means for making a first sound to be recorded in that band which would otherwise be used for recording the luminance component of the aforesaid video signal and a second sound to be recorded in that band which would otherwise be used for recording the chrominance component of the aforesaid video signal, wherein the control means is constructed in the form of selector circuits 17, 17' cooperative with the microcomputer 20, and the apparatus for reproducing the video signals and/or audio signals recorded on the recording medium is provided with control means for reproducing as the first sound the signal recorded in that band which was assigned to the record of the luminance component of the video signal, and as the second sound the signal recorded in that band which was assigned to the record of the chrominance component of the video signal, wherein the control means is constructed in the form of the selector circuits 62, 62' cooperative with the microcomputer 20.

Although the embodiments of the invention have been described in connection with the L+R signal as the first sound information and the L−R signal as the second sound information, it is to be understood that the present invention is not confined thereto. So, variations may be made. For example, the first and second sounds may be of different language from each other.

As has been described in great detail above, according to the first embodiment of the invention, the bands assigned to the record of the luminance and chrominance components of the video signal are made usable for recording the first and second sound informations respectively, thereby giving an advantage that two different sounds, for example, stereophonic sounds, can be recorded in one and the same track. According to the second embodiment of the invention, the signals recorded in the bands originally assigned to the luminance and chrominance components of the video signal are made reproducible as the first and second sounds respectively, thereby giving an advantage that two different sound informations as, for example, in the stereophonic sound can be reproduced at the same time from one and the same track.

According to the standard format of an audio record of still video as has already been defined, a rule is set forth that the audio signal be recorded in the band for the luminance signal. Therefore, when the magnetic sheet 12 having recorded therein the audio signal in, for example, stereo mode by the apparatus of the character described, is reproduced by a reproducing apparatus employing the above-identified standard format, nothing wrong will go on except for reproducing only the L+R signal.

What is claimed is:

1. A signal recording apparatus comprising:
   (a) first means for processing a signal of first signal band to record;
   (b) second means for processing a signal of second signal band different from said first signal band to record, the recording processing of said second means including a modulating process; and signal and a_
   (c) means for selecting one of an audio video signal to be supplied with its first and second informations to said first and said second means respectively.

2. An apparatus according to claim 1, wherein said video signal contains a luminance signal and a chrominance signal.

3. An apparatus according to claim 2, wherein said luminance signal is processed to record by said first means, and said chrominance signal is processed to record by said second means.

4. An apparatus according to claim 1, wherein said first audio signal is the L+R signal, and said second audio signal is the L−R or R−L signal, where said L signal represents the left channel audio signal, and said R signal represents the right channel audio signal.

5. An apparatus according to claim 1, wherein the recording process of said first means includes a modulating process.

6. An apparatus according to claim 1, further comprising means for converting the signal bands of said first and said second audio signals to said first and said second signal bands respectively.

7. An apparatus according to claim 7, wherein said converting means is in the form of means for converting the time base of said audio signal.

8. An apparatus according to claim 7, wherein said converting means is in the form of means for compressing the time base of said audio signal.

9. A recording apparatus for recording the luminance signal component of a video signal in a first band and the chrominance signal component in a second band, characterized by comprising:
   means for recording audio signals in both said first and said second bands,
   wherein said recording means is means for recording a L+R audio signal in said first band and a L−R or R−L audio signal in said second band, where L represents a left channel audio signal, and R represents a right channel audio signal.

10. A recording apparatus according to claim 9, further comprising:
    first processing means for processing said signal of first band to record; and second processing means for processing said signal of second band to record.

11. A recording apparatus according to claim 10, wherein said first and said second processing means each include modulating means.

12. A recording apparatus according to claim 9, further comprising:
    first means for compressing the time base of said L+R audio signal; and second means for compressing the time base of said L−R or R−L audio signal.

13. A signal reproducing apparatus comprising:
    (a) first means for processing a signal of first signal band to reproduce;
    (b) second means for processing a signal of second signal band different from said first signal band to reproduce;
    (c) video signal forming means receptive of the outputs of said first and said second means for producing a video signal;
    (d) audio signal forming means receptive of the outputs of said first and said second means for producing an audio signal; and
    (e) selecting means for selecting one of said video and said audio signal forming means to be supplied with the outputs of said first and said second means.

14. An apparatus according to claim 13, wherein said video signal contains the luminance signal and the chrominance signal.

15. An apparatus according to claim 14, wherein said luminance signal is included in said first signal band and said chrominance signal is included in said second signal band.

16. An apparatus according to claim 13, wherein said audio signal contains the L+R signal and L−R or R−L signal, where said L signal represents the left channel audio signal and said R signal represents the right channel audio signal.

17. An apparatus according to claim 13, wherein the reproducing process of said first means includes a demodulating process.

18. An apparatus according to claim 13, wherein the reproducing process of said second means includes a demodulating process.

19. An apparatus according to claim 13, wherein said audio signal forming means is in the form of means for converting the outputs of said first and said second means to audio signal bands.

20. An apparatus according to claim 19, wherein said converting means is in the form of means for converting the time bases of the outputs of said first and said second means.

21. An apparatus according to claim 20, wherein said converting means is in the form of means for expanding the time bases of the outputs of said first and said second means.

22. A processing apparatus for processing signals transmitted in a first band and a second band, comprising:
   (a) first processing means for processing the signals of said first band and said second band as video signals;
   (b) second processing means for processing the signals of said first band and said second band as audio signals; and
   (c) selection means for enabling the operation of either one of said first processing means and said second processing means.

23. A processing apparatus according to claim 22, wherein said second processing means is in the form of reproducing as the L+R audio signal the signal recorded in said first band and as the L−R or R−L audio signal the signal recorded in said second band, where L represents the left channel audio signal and R represents the right channel audio signal.

24. A reproducing apparatus according to claim 23, wherein said processing means includes means for converting the audio signals reproduced from said first and said second bands to an audio signal band.

25. A processing apparatus according to claim 24, wherein said converting means is in the form of converting the time base of said audio signal.

26. A processing apparatus according to claim 25, wherein said converting means is in the form of expanding the time base of said audio signal.

27. A signal recording apparatus comprising:
   (a) first means for processing a signal of first signal band to record;
   (b) second means for processing a signal of second signal band different from said first signal band to record; and
   (c) means for selecting one of an audio signal and a video signal to be supplied with its first and second information to said first and said second means respectively, wherein said first audio signal is a L+R signal, and said second audio signal is a L−R or R−L signal, where said L signal represents a left channel audio signal, and said R signal represents a right channel audio signal.

28. An apparatus according to claim 27, wherein said video signal contains a luminance signal and a chrominance signal.

29. An apparatus according to claim 27, wherein said luminance signal is processed to record by said first means, and said chrominance signal is processed to record by said second means.

30. An apparatus according to claim 27, wherein the recording process of said first means includes a modulating process.

31. An apparatus according to claim 27, wherein the recording process of said second means includes a modulating process.

32. An apparatus according to claim 27, further comprising means for converting the signal bands of said first and said second audio signals to said first and said second signal bands respectively.

33. An apparatus according to claim 32, wherein said converting means is in the form of means for converting the time base of said audio signal.

34. An apparatus according to claim 33, wherein said converting means is in the form of means for compressing the time base of said audio signal.

35. A signal recording apparatus comprising:
   (a) first means for processing a signal of first signal band to record;
   (b) second means for processing a signal of second signal band different from said first signal band to record;
   (c) means for selecting one of an audio signal and a video signal to be supplied with its first and second information to said first and said second means respectively; and
   (d) means for converting the signal band of said first and said second audio signals to said first and said second signal bands respectively,
said converting means being in the form of means for converting the time base of said audio signal.

36. An apparatus according to claim 35, wherein said video signal contains a luminance signal and a chrominance signal.

37. An apparatus according to claim 36, wherein said luminance signal is processed to record by said first means, and said chrominance signal is processed to record by said second means.

38. An apparatus according to claim 35, wherein said first audio signal is L+R signal, and said second audio signal is a L−R or R−L signal, where said L signal represents a left channel audio signal, and said R signal represents a right channel audio signal.

39. An apparatus according to claim 35, wherein the recording process of said first means includes a modulating process.

40. An apparatus according to claim 35, wherein the recording process of said second means includes a modulating process.

* * * * *

UNITED STATES PATENT AND TRADEMARK OFFICE
CERTIFICATE OF CORRECTION

PATENT NO. : 4,823,197
DATED : April 18, 1989
INVENTOR(S) : Tsuguhide Sakata, et al.

It is certified that error appears in the above-identified patent and that said Letters Patent is hereby corrected as shown below:

```
Item[30] change "Feb." to -- Dec. --.
Col. 1, line 68, delete "," both occurrences
Col. 3, line 13, after "sec" insert -- . --.
Col. 3, line 17, after "sec" insert --. --.
Col. 3, line 46, change "rightchannel" to -- right-channel --.
Col. 4, line 42, after "control the" insert -- rotation of
   the motor 13.  If the video signal does not --.
Col. 4, line 49, after "then the" insert -- operator turns off
   the switch 23.  Responsive to this, --.
Col. 5, line 60, change "taxes" to -- takes --.
Col. 7, line 65, after "sound" insert -- , --.
Col. 8, line 20, change "being" to -- be --.
Col. 8, line 25, change "in operative" to -- inoperative --.
Col. 8, line 30, change "pr" to -- processing --.
Col. 9, lines 35-36, delete "signal and a".
Col. 9, line  59, change "claim 7" to -- claim 6 --.
Col. 11, line 20, change "reproducing" to -- processing --.
Col. 12, line 40, after "is" insert -- a --.
```

Signed and Sealed this

Twenty-eighth Day of November 1989

Attest:

JEFFREY M. SAMUELS

Attesting Officer     Acting Commissioner of Patents and Trademarks